July 28, 1953   R. NUSSBERGER ET AL   2,646,902
HOISTING AND DUMPING MEANS FOR TRUCKS CARRYING DIRT
Filed Jan. 24, 1949   3 Sheets-Sheet 1
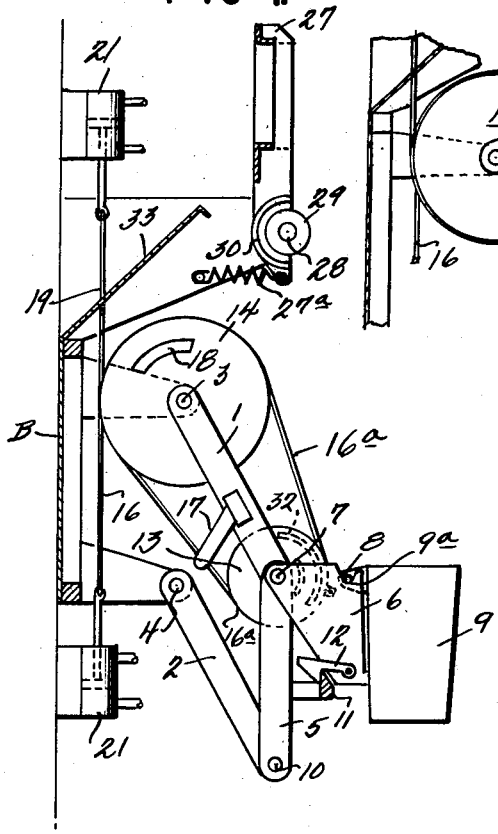
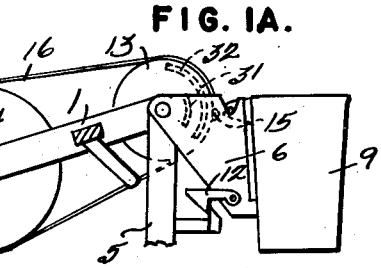
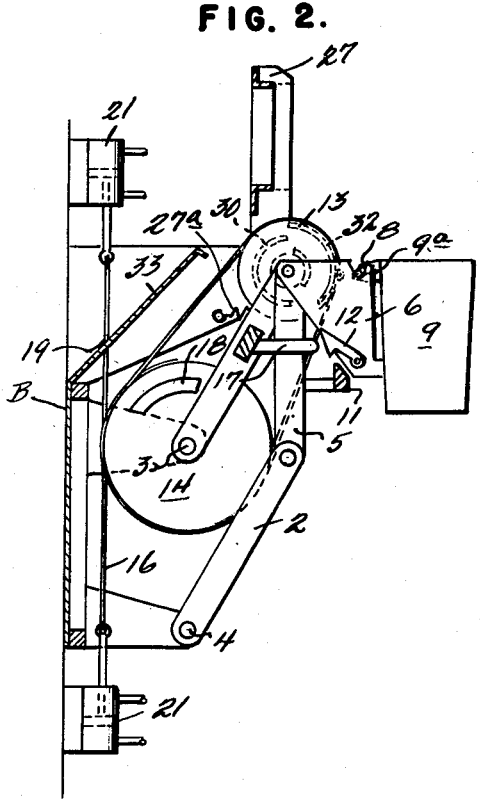
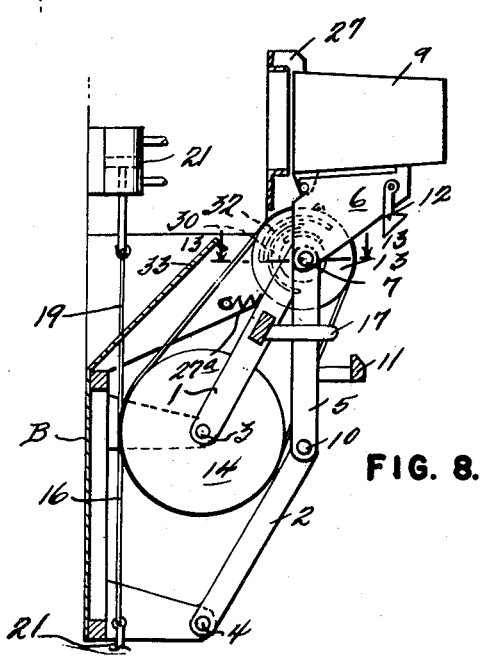
INVENTORS
RENE NUSSBERGER
JEAN PELLAT-FINET
BY Adams & Bush
ATTORNEYS July 28, 1953  R. NUSSBERGER ET AL  2,646,902
HOISTING AND DUMPING MEANS FOR TRUCKS CARRYING DIRT
Filed Jan. 24, 1949  3 Sheets-Sheet 2
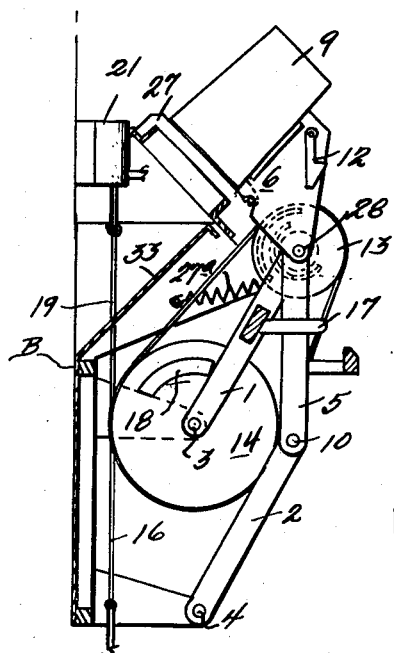
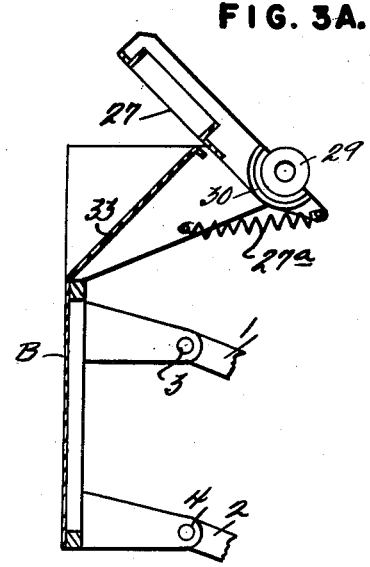
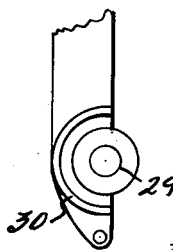
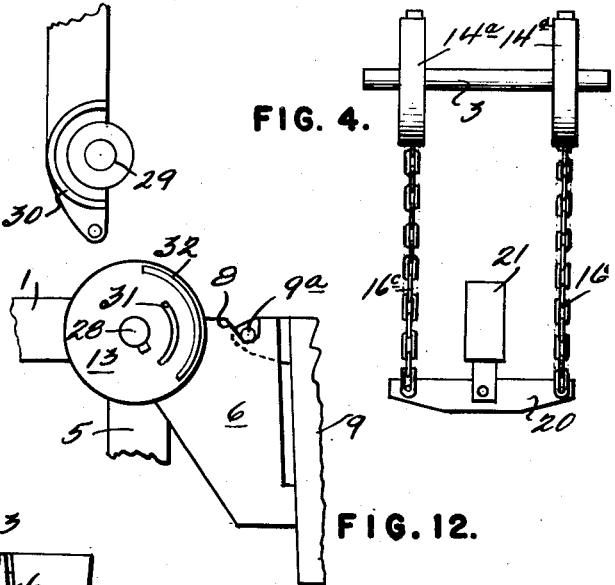
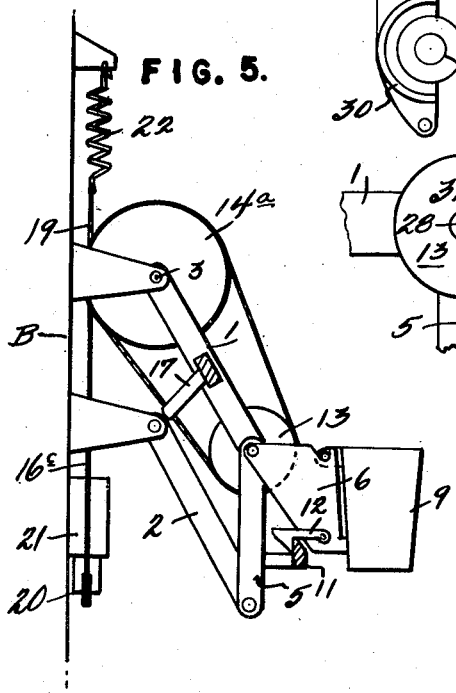
INVENTORS
RENE NUSSBERGER
JEAN PELLAT-FINET
BY Adams + Bush
ATTORNEYS July 28, 1953 R. NUSSBERGER ET AL 2,646,902
HOISTING AND DUMPING MEANS FOR TRUCKS CARRYING DIRT
Filed Jan. 24, 1949 3 Sheets-Sheet 3

INVENTORS
RENÉ NUSSBERGER
JEAN PELLAT-FINET

BY Adams & Bush
ATTORNEYS

Patented July 28, 1953

2,646,902

UNITED STATES PATENT OFFICE 2,646,902

HOISTING AND DUMPING MEANS FOR TRUCKS CARRYING DIRT

René Nussberger and Jean Pellat-Finet, Lyons, France, assignors to Societe Sovel Vehicules Electriques Industriels, Villeurbanne, France, a corporation of France Application January 24, 1949, Serial No. 72,392
In France January 31, 1948

5 Claims. (Cl. 214—313)

This invention relates to means for emptying trash cans or bins into collecting vehicles without liberating dust. Such bins are generally provided at their upper edge with a hooking bar which enables them to be hung on hooks placed on the pick-up truck and rocked or swung or tilted for the purpose of emptying them. The manipulation of these bins requires powerful forces, especially when they are of large capacity, and the loading weight is great.

The object of the present invention is to reduce these forces to a minimum, to pick up the bins at a low height above the ground, and then to raise them to a suitable height to be rocked or tilted automatically by the aid of a hoisting and rocking or bascule mechanism, upon which a continuous linear or rotary movement is impressed, which is then converted into a discontinuous movement.

Other features of the present invention will appear in the course of the following description, with reference to the accompanying drawings, in which several forms of construction of the device according to the present invention are illustrated by way of example.

Figs. 1, 1a, 2, 3, show one form of construction of the present invention in side elevation in different positions; Fig. 1a corresponding to the bin raised up half-way; Fig. 2 showing the highest position of the bin, and Fig. 3 showing the final dumping position;

Fig. 3a shows a detail of the return spring in extended position during the dumping of a trash box before it has effected its recoil action;

Figs. 4 and 5 show a first modification of the invention, using chains and one hydraulic jack;

Fig. 8 shows a detail of the structure for controlling dumping, and shows the bin when it has attained a horizontal position during the course of the dumping operation;

Fig. 11 is a detail of the circular lock for preventing recoil movement during operation between the frame carrying the loaded bin and the restraining rim applied to the top of the bin, showing the pivot carrying a resilient roller and the axially mounted arc pieces fixedly carried by the rim;

Fig. 12 is a detail of the circular lock showing the two axially mounted arc pieces attached rigidly to the bin-carrying frame.

Figure 6:
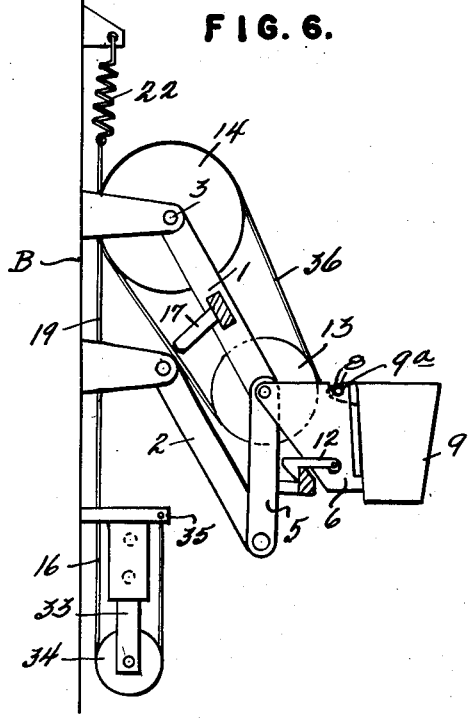
Figs. 6 and 6a show a second modification using two hydraulic jacks connected to one common supply pipe.

As shown in Figs. 1, 2 and 3, the device forming the subject of the present invention is constituted essentially of two hinged quadrilaterals placed spacedly side by side. For the clearness of the drawing, only one quadrilateral has been shown in these figures, the other one being behind the one shown. These quadrilaterals are each formed of two lateral pieces or cranks or arms 1 and 2, capable of turning about two fixed pivots 3 and 4, fixed to the vehicle body B, and of a coupling rod or link 5, connected at its two ends to trunnions or pivots 7 and 10 carried by lateral pieces 1 and 2, respectively, at their ends remote from fixed pivots 3, 4.

In the form of construction illustrated in Figs. 1, 2, 3, each hinged quadrilateral is constituted by a parallelogram, which is a particular case of the general quadrilateral. This latter is, however, utilized by preferance, for it permits nonparallel movements of translation, which are useful in certain cases.

The upper lateral pieces or cranks 1 of the two quadrilaterals carry at their ends remote from fixed pivots 3, 4, a frame 6, which they engage by means of pivots or trunnions 7. Upon this frame 6 are fixed hooks 8 for the holding of the bin 9 by the hooking bar 9a on its upper edge.

The frame 6 is supported against the coupling rod 5 at its arm 11, and itself forms a supporting back for the bin 9. It is temporarily secured to the coupling rod 5 by a hook 12. Two wheels 13 of which only one is shown, are constructed fixedly integral with the frame 6. On the other hand, upon the fixed pivot 3, are placed two freely rotatable wheels 14, of which only one is shown. Around the wheels 13 and 14 there is wound a cable 16a attached at pin 15 to one of the wheels 13, or else a stud chain, the two halves of which would then be mounted in different planes, starting from the point of attachment 15 on the wheel 13.

This device of Figs. 1, 2, 3, operates in the following manner. If a pull is exerted upon the terminal portion 16 of the cables or chains 16a, the lateral pieces or cranks 1 and 2 turn about their pivots, thereby raising the assemblage formed by the coupling rod 5, the frame 6 and the bin 9. As the can or bin 9 rises, the frame 6 and the bin 9 maintain their relative positions with respect to the coupling rod 5 until the hook 12 encounters a releasing cam face arm 17, carried by the lateral piece or crank 1, which lifts and disengages hook 12. At this moment, as shown in Fig. 2, the lateral pieces or cranks 1 encounter fixed stops 18 of which only one is shown, provided upon the vehicle body B, which stops them. If the pull upon the terminal portion 16 of the cable or chain continues, the integral wheel 13 begins to revolve, taking with it the frame 6 and the bin 9 right up to the extreme dumping positions, as shown in Fig. 3. The contents of the bin falls out through the rim piece 27 and follows an inclined plane 33 to finally fall into the body of the truck.

A pull upon the other terminal portion 19 of the cable or chain 16a will cause the return and the descent of the frame 6 and of the bin 9, the movements being effected in the reverse order.

The pulls upon the cable terminal portions 16 and 19 may be exerted by any convenient means, such as hydraulic jacks.

Figs. 4 and 5, in front and side elevation, show another form of construction. This form of construction comprises two assemblages of chains 16c and wheels 14 placed side by side, the ends of the chains 16c being connected to a balancing rocker 20, upon the middle of which bears the piston of a hydraulic jack 21. The return is effected by two springs 22, 22, pulling upon the terminal portions 19 of the chains 16c, 16c.

Figure 6A:
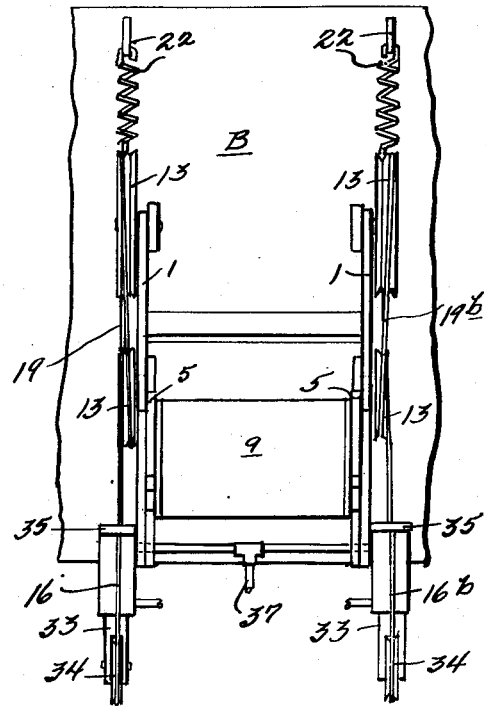

Fig. 6 shows a side view of another form of construction of which a single system of quadrilaterals, chains, wheels, and jacks is illustrated, there being a similar system back of the one shown. Fig. 6a is a front view of the arrangement shown in Fig. 6, and shows both systems of quadrilaterals, chains, wheels, and jacks, and the common supply pipe for the jacks. The drive is constituted by two hydraulic jacks 33, 33, of which only one is shown in Fig. 6, each of which jacks exerts a pull upon the portion of each chain 16 and 16b, through the medium of a pulley 34, carried on the piston of the jack 33, the end of each chain being attached to a fixed point 35. The equality of the forces applied by the two chains 16, 16b, is then obtained hydraulically, for the two jacks 33, 33 are connected in parallel to the same common pipe 37 supplying liquid under pressure.

Figure 7:
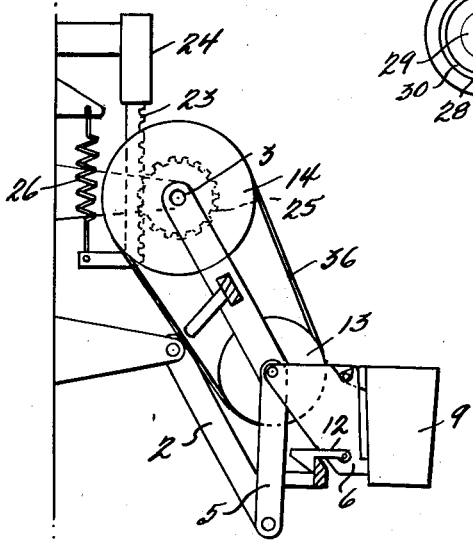
Fig. 7 shows a modification of the arrangement of Figs. 1–3, using endless chains.

Fig. 7 shows a still further modification in which the arrangement is identical with that shown in Figs. 1, 2, 3, with this difference, that the chains 36, 36, of which only one is shown, are endless and pass around the two pairs of wheels 13, 13, and 14, 14, of which only one pair is shown, the wheels 14 being mounted keyed to the pivot shaft 3. Only one wheel 13 and one wheel 14 is shown, the other wheel 13 and the other wheel 14 being back of the ones shown. It will be sufficient to rotate this shaft 3 in order to obtain first the rotation of the lateral pieces or cranks 1 and 2, and then the rotation of the wheel 13, of the frame 6, and of the bin 9, as in the device shown in Figs. 1, 2, 3. A rotation in the opposite direction will cause the return and the descent of the bin.

The rotation of this shaft 3 in both directions may be effected by any convenient means, for instance, hydraulic jack, by a tension spring, or through the medium of a rack and toothed wheel, or equivalent device.

In the form of construction illustrated in Fig. 7, the drive is constituted by a rack 23 actuated by a hydraulic jack 24. The rack 23 drives a pinion 25, which is mounted rigidly on the shaft 3. The return of the assemblage is effected by a spring 26.

These tilting devices for dumping trash cans without liberating dust, as have been described, comprise, as illustrated particularly in Fig. 8, a lunette or rim 27 formed of a frame pierced with a circular orifice against which the open top of the bin 9 bears when being emptied. This rim 27 rocks about a horizontal hinge or pivot 28 placed at its lower part, and is returned into its position of rest by a spring 27a, whose ends may respectively be attached to the truck chassis and to the lug of rim 27. For the rocking of the rim 27, pushed by the bin 9, a turning movement has to be exerted, which causes a force tending to push back the bin-carrying frame 6 and cause rebound or recoil movement.

Figure 9:
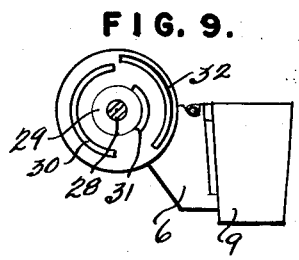
Figs. 9 and 10 show, in successive positions, the details of the circular locking arrangement for preventing rebound rocking movement of the trash can at the time of dumping.
Figure 10:
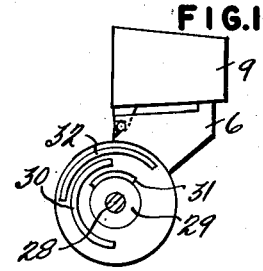

This recoil movement is prevented, according to the present invention, by a circular lock, which mechanically connects frame 6 to tilting rim 27. Fig. 9 represents the relative positions of the parts of this lock at the time when the frame 6 is pressed against the foot of the rim 27, and Fig. 10 represents the positions of these parts after the frame 6 and the bin 9 have effected part of their displacement in the course of the rocking movement, and the bin 9 has come into contact with the rim 27. The parts 28, 29, 31, shown in Figs. 9 and 10, are mounted on pivot 28 shown in Fig. 8, and connect rim 27 of Fig. 8 to frame 6 thereof. The axis of pivot 28 is collinear with the axis of pivot 7 and the two pivots are mounted in axially mutually spaced relation.

The pivot shaft 28 is fixedly attached to rim 27 and carries a roller 29 of resilient material, and a fixed arc piece 30 concentric with its horizontal pivot 28, upon which rim 27 and roller 29 are rotatably mounted. The frame 6, on the other hand, carries an abutment arc piece 31, which comes to bear against the resilient roller 29. It also carries a concentric arc piece 32. At the time of the rotation of the frame 6, the arc piece 32 takes up a position behind the fixed arc piece 30, which prevents the recoil or rebound towards the right of the frame 6.

The radial spacings of arc pieces 31, 30, 32, are exaggerated in Figs. 9 and 10, to make the drawing clearer. During the rotation of bin 9 in contact with frame 6 and rim 27, and on the position of Fig. 10, the force of recoil tending to push back frame 6 is taken up by the arc pieces 31, 30, 32, and resilient roller 29.

Figure 13:
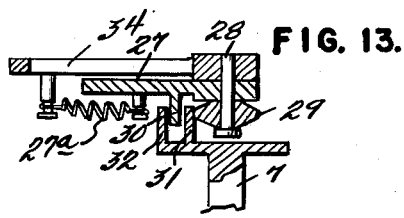
Fig. 13 is a detail cross-section taken on the line 13—13 of Fig. 8, showing the parts of the circular lock illustrated in Figs. 11 and 12.

Figs. 11, 12, 13 show, in different views, the circular lock of Figs. 9 and 10.

It will be understood that the raising and rocking device that has just been described, may find its application not only in the emptying of dust bins, but in all those cases in which a load has to be raised to a certain height and then tilted by rotation.

We claim:

1. In apparatus for lifting and dumping loaded cans into a vehicle body, a vehicle body, a first fixed pivot and a second fixed pivot attached to said vehicle body and said first fixed pivot being positioned above said second fixed pivot, a first longitudinal member pivotally mounted on said first fixed pivot, a second longitudinal member pivotally mounted on said second fixed pivot, a first auxiliary pivot mounted on said first longitudinal member on its end remote from said first fixed pivot, a second auxiliary pivot mounted on said second longitudinal member at its end remote from said second fixed pivot, a cross rod pivotally mounted at its ends on said auxiliary pivots, a first pulley rotatably mounted on said first fixed pivot, a supporting frame comprising trunnion means by which it is pivotally supported on said first auxiliary pivot, a can comprising a hooking bar on its upper edge, said frame comprising hooks engageable with said hooking bar, a second pulley fixedly mounted on said frame adjacent said first auxiliary pivot, a hoisting cable wound around said two pulleys and being fixed at a point on said second pulley, means for applying tractive force to said cable, a locking lug fixedly carried on said cross rod, a releasable latch carried by said frame and releasably engageable with said lug, a releasing arm carried by said first longitudinal member and engageable with said latch for releasing the same when said first longitudinal member has been raised into a determined position, and stop means fixedly carried on said vehicle body and positioned to engage said first longitudinal member and stop its pivoting movement when it has been raised into its said determined position, whereby the application of continued traction to said cable after the attainment of said determined position by said first longitudinal member causes rotation of said second pulley and dumping of said can.

2. Apparatus according to claim 1, said apparatus being so constructed that said two fixed pivots and said two auxiliary pivots constitute the corners of a parallelogram.

3. Apparatus according to claim 1, said means for applying tractive force being a jack to which said cable is attached.

4. Apparatus according to claim 1, said cable being endless and being wound on said pulleys, and said means for applying tractive force being connected for causing rotation of said first pulley.

5. Apparatus according to claim 1, and a third auxiliary pivot extending in the same direction as and adjacent to said first auxiliary pivot, an open rim piece rockably mounted on said third auxiliary pivot for engagement with the upper edge of said can for restraining the same, and circular lock means for taking up and preventing recoil movement between said frame and said rim piece and comprising a resilient roller rotably mounted on said third auxiliary pivot, a first arcuate piece, a second arcuate piece, and a third arcuate piece mounted successively in mutually interleavable relation concentrically about said third auxiliary pivot and said roller at progressively increasing radial distances therefrom, and said first arcuate piece nearest said roller being in bearing relation therewith, said first and third said arcuate pieces being fixedly carried by said frame, and said roller and said second arcuate piece being fixedly attached to said rim piece.

RENÉ NUSSBERGER.
JEAN PELLAT-FINET.

References Cited in the file of this patent
UNITED STATES PATENTS

| Number | Name | Date |
| --- | --- | --- |
| 723,771 | Anderson | Mar. 24, 1903 |
| 1,045,072 | Parker | Nov. 19, 1912 |
| 2,388,987 | Morrison | Nov. 13, 1945 |